(12) United States Patent
Kellner et al.

(10) Patent No.: US 10,906,593 B2
(45) Date of Patent: Feb. 2, 2021

(54) BODY STRUCTURE FOR A BATTERY-OPERATED MOTOR VEHICLE

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 34 days.

(21) Appl. No.: 16/367,475

(22) Filed: Mar. 28, 2019

(65) Prior Publication Data

US 2019/0337575 A1 Nov. 7, 2019

(30) Foreign Application Priority Data

May 2, 2018 (DE) .......................... 10 2018 110 481

(51) Int. Cl.
| | | |
|---|---|---|
| *B62D 25/20* | (2006.01) | |
| *B60K 1/04* | (2019.01) | |
| *B62D 25/04* | (2006.01) | |
| *B62D 29/00* | (2006.01) | |
| *B60K 6/28* | (2007.10) | |

(52) U.S. Cl.
CPC ............. *B62D 25/20* (2013.01); *B62D 25/04* (2013.01); *B62D 29/008* (2013.01); *B60K 1/04* (2013.01); *B60K 6/28* (2013.01); *B60K 2001/0438* (2013.01); *B60Y 2200/91* (2013.01); *B60Y 2200/92* (2013.01)

(58) Field of Classification Search
CPC .... B62D 25/20; B62D 23/00; B62D 23/2036; B62D 29/008; B62D 29/041; B62D 29/046; B60K 1/04; B60K 6/28; B60K 2001/0438; B60F 2200/91; B60F 2200/92; B60F 2306/01
USPC ..... 296/203.01, 203.03, 204, 193.07, 187.08
See application file for complete search history.

(56) References Cited

U.S. PATENT DOCUMENTS

| | | | |
|---|---|---|---|
| 8,573,683 B2 | 11/2013 | Gadhiya et al. | |
| 9,061,712 B2 | 6/2015 | Patberg et al. | |
| 9,160,042 B2 * | 10/2015 | Fujii | ........................ B60K 1/04 |

(Continued)

FOREIGN PATENT DOCUMENTS

| | | |
|---|---|---|
| DE | 202016104744 U1 | 9/2016 |
| WO | 2012117204 A1 | 9/2012 |

(Continued)

*Primary Examiner* — Dennis H Pedder
(74) *Attorney, Agent, or Firm* — RatnerPrestia

(57) ABSTRACT

A body structure for an, in particular battery-operated, motor vehicle, with at least one A pillar, a first structure longitudinal member, a second structure longitudinal member, a first structure transverse member, a second structure transverse member, and a floor panel for delimiting a passenger cell of the body structure in relation to an environment. A receiving compartment of a drive module, in particular in the form of a battery module, is bounded by a first longitudinal member and a second longitudinal member, which are formed from a first material, and by a first transverse member and a second transverse member, which are formed from a second material, and also by the floor panel, and by a covering panel for bounding the receiving compartment in relation to the environment. The covering panel is produced from a third material.

17 Claims, 1 Drawing Sheet

(56) References Cited

U.S. PATENT DOCUMENTS

| | | | |
|---|---|---|---|
| 9,358,869 B2 | 6/2016 | Le Jaouen et al. | |
| 9,783,245 B1* | 10/2017 | Marchlewski | B62D 33/02 |
| 10,632,857 B2* | 4/2020 | Matecki | H01M 2/1083 |
| 2018/0337377 A1* | 11/2018 | Stephens | B60K 1/04 |

FOREIGN PATENT DOCUMENTS

| | | |
|---|---|---|
| WO | 2013007515 A1 | 1/2013 |
| WO | 2013156732 A1 | 10/2013 |

* cited by examiner

BODY STRUCTURE FOR A BATTERY-OPERATED MOTOR VEHICLE

CROSS-REFERENCE TO RELATED APPLICATION

This application claims priority to German Patent Application No. DE 10 2018 110 481.2, filed May 2, 2018, which is incorporated by reference herein in its entirety.

FIELD OF THE INVENTION

The invention relates to a body structure for an, in particular battery-operated, motor vehicle.

BACKGROUND OF THE INVENTION

Drive units of motor vehicles which have drive modules in the form of batteries require a higher amount of construction space compared with a conventional internal combustion engine because of the currently relatively low energy density of the drive modules. The drive modules are preferably accommodated in a floor region of the motor vehicle so that sufficient space continues to be present in a passenger cell of the motor vehicle and in the trunk compartment.

Laid-open application WO 2012/117204 A1, which is incorporated by reference herein, discloses a chassis for a motor vehicle, wherein the chassis is designed for receiving a drive module in particular in the form of a battery module. The chassis has longitudinal and transverse members which are produced from aluminum, wherein the longitudinal and transverse members are arranged in a cavity formed in the chassis and are connected to the chassis via auxiliary elements. The chassis is designed independently of a body structure of the motor vehicle.

Patents EP 2 729 348 B1 and EP 2 839 524 B1, which are incorporated by reference herein, likewise disclose chassis for motor vehicles having two longitudinal members and two transverse members which bound a receiving compartment of the battery or of the plurality of batteries. In order to bring about effective protection of the drive module, EP 2 729 348 B1 discloses a defined deformation behavior of the longitudinal and transverse members, such as, for example, predetermined deformation points and predetermined breaking points in the members, and/or brought about by means of easily deformable material. According to the disclosure of EP 2 839 524 B1, said longitudinal and transverse members can preferably be produced from steel or an aluminum extruded profile or an aluminum alloy or a combination of the latter two.

Utility model DE 20 2016 104 744 U1, which is incorporated by reference herein, discloses a floor assembly for receiving the drive modules, wherein the floor assembly is connected to a body structure. In order in particular to avoid distortions, the floor assembly has profile members which are produced in particular from light metal, for example an aluminum or magnesium alloy, and can be cold-joined with the aid of connecting elements producing a force and form fit.

U.S. Pat. No. 8,573,683 B2, which is incorporated by reference herein, discloses a battery module housing for installing in a body structure, wherein the battery module housing has longitudinal and transverse members which are arranged between a housing floor panel and a housing ceiling panel. The battery module housing is produced from aluminum.

SUMMARY OF THE INVENTION

Described herein is a body structure for an, in particular battery-operated, motor vehicle, which serves to reduce the number of components of the motor vehicle, in particular to omit a battery housing.

A body structure according to aspects of the invention for an, in particular battery-operated, motor vehicle comprises at least one A pillar, a first structure longitudinal member and a second structure longitudinal member, and also a first structure transverse member and a second structure transverse member, and also a floor panel for delimiting a passenger cell of the body structure in relation to an environment. A receiving compartment of a drive module, which is designed in particular in the form of a battery module, is provided which is bounded by a first longitudinal member and a second longitudinal member, which are formed from a first material, and by a first transverse member and a second transverse member, which are formed from a second material. Furthermore, the floor panel is provided for bounding the receiving compartment in the direction of the passenger cell. A covering panel is designed for bounding the receiving compartment in relation to the environment, and said covering panel is produced from a third material. According to aspects of the invention, the first structure longitudinal member and the second structure longitudinal member at least partially correspond to the first longitudinal member and to the second longitudinal member, respectively, and the first structure transverse member and the second structure transverse member at least partially correspond to the first transverse member and to the second transverse member, respectively. This means, in other words, that, in addition to the floor panel contained in the body structure, the longitudinal members and transverse members are also parts of the body structure. Therefore, the customarily additional housing of the drive module that is designed in particular in the form of a battery module can be omitted with costs being reduced. In addition to the cost reduction, a further advantage is a significant saving on construction space since at least one installation gap is customarily formed between the housing of the drive module and the body structure, said installation gap being omitted.

In a refinement of the body structure according to aspects of the invention, the three materials, the first material, the second material and the third material, have a common main material.

The battery module is customarily connected in a battery module housing to the body structure with the aid of screws so as to be removable from below. The battery module housing is predominantly composed of aluminum, whereas the body structure is produced from steel at least in the region of the connection.

In accordance with requirements imposed on what is referred to as the electromagnetic compatibility, at least contact corrosion should be avoided so that the battery module is arranged in a protected manner in the receiving compartment. This can be achieved in that those components of the receiving compartment that are exposed to the environment and therefore to the influences of salt, dirt and water and the connecting points thereof to the body structure have the same main material. This means, in other words, that the covering panel, therefore the panel which downwardly bounds the receiving compartment, and the frame elements, longitudinal and transverse members, which bound the receiving compartment transversely with respect to the covering panel, have at least the same main material, as a result of which contact corrosion can be avoided and therefore the battery module is arranged in a protected manner in the receiving compartment.

In accordance with electromagnetic compatibility, the covering panel has to be at least partially composed of metal and has to be in direct contact with the transverse and longitudinal members without an intermediate connection of layers providing electromechanical separation, such as, for example, paint or adhesive layers. It is therefore advantageous to form the covering panel from a material having the same main material as the members.

The floor panel serves for sealing and bounding the receiving compartment in the direction of the passenger cell, thus upward. Structure longitudinal members, preferably side sills, which are parts of the body structure, serve to laterally delimit the receiving compartment. Transverse members of the body structure bound the receiving compartment in the direction of the rear and of the front of the motor vehicle. Therefore, in addition to the saving on construction space in comparison to the prior art, a receiving compartment which is more protected against corrosion is realized in which the drive module can be accommodated within the body structure since all of the body structure components forming an interface with the covering panel are formed from a main material, in particular containing aluminum.

The first material, the second material and the third material are advantageously an alloy. Each component can therefore have a corresponding material composition in accordance with its function, with it being possible for the materials to be identical or different from one another.

In order to bring about a lightweight design leading to a saving on weight, aluminum, steel, magnesium or titanium is preferably used as the main material.

In order to realize a preferred energy consumption with a simultaneously lightweight design, the longitudinal members and/or transverse members are advantageously configured in a sheet-metal shell design and/or profile design.

The longitudinal members and/or transverse members are preferably connected indirectly and/or directly to one another, wherein weld seams are preferably formed at the intersections thereof.

In a further refinement, of the body structure according to aspects of the invention, member surfaces of the longitudinal members and transverse members that are formed facing the covering panel lie in one plane. That is, they are formed flat so that, firstly, the covering panel can be designed in the form of a simple, flat panel and, secondly, the receiving compartment can be sealed in relation to the environment in a simple manner. In addition, to further ensure the tightness, a sealing element can be formed in a manner at least partially surrounding the covering panel.

All of the abutting edges of the component members meeting one another and possible intermediate elements between the members, floor panel and covering panel should preferably be provided with a sealing element which is advantageously designed as a sealing cord and/or PVC strip. An adhesive compound can also be used as sealing element when the components are adhesively bonded.

In a further refinement of the body structure according to aspects of the invention, the longitudinal members and/or transverse members are indirectly and/or directly connected to the floor panel. The floor panel closes the receiving compartment in the direction of the passenger cell. By means of the indirect and/or direct connection of the members to the floor panel, a secured delimitation and preferably also sealing of the receiving compartment in relation to the passenger cell can be achieved. A receiving compartment corresponding to the electromagnetic compatibility can therefore be formed.

BRIEF DESCRIPTION OF THE DRAWING

Further advantages, features and details of the invention emerge from the description below of preferred exemplary embodiments and with reference to the drawing. The features and combinations of features mentioned above in the description and also the features and combinations of features mentioned below in the description of the figures and/or shown by themselves in the figures can be used not only in the respectively stated combination, but also in different combinations or on their own without departing from the scope of the invention. Identical or functionally identical elements are assigned identical reference signs. In the figures.

DETAILED DESCRIPTION OF THE INVENTION

Figure 1:
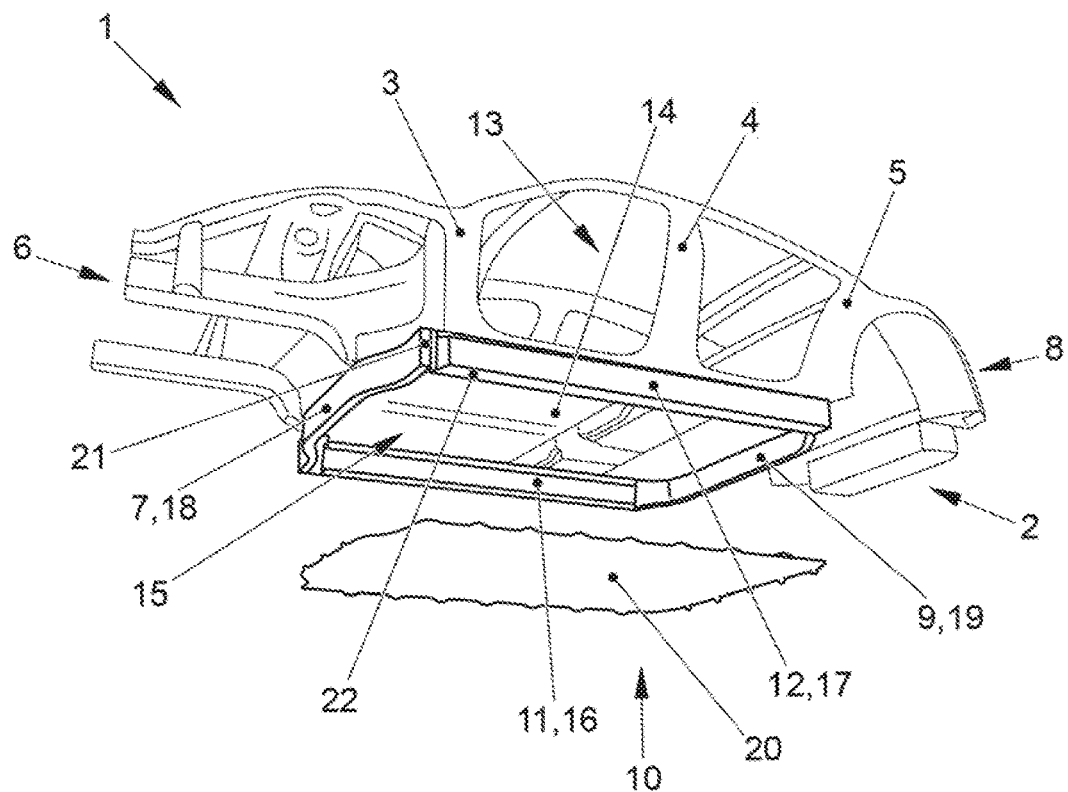
FIG. 1 shows a body structure according to aspects of the invention in a perspective exploded illustration from the front and bottom.
Figure 2:
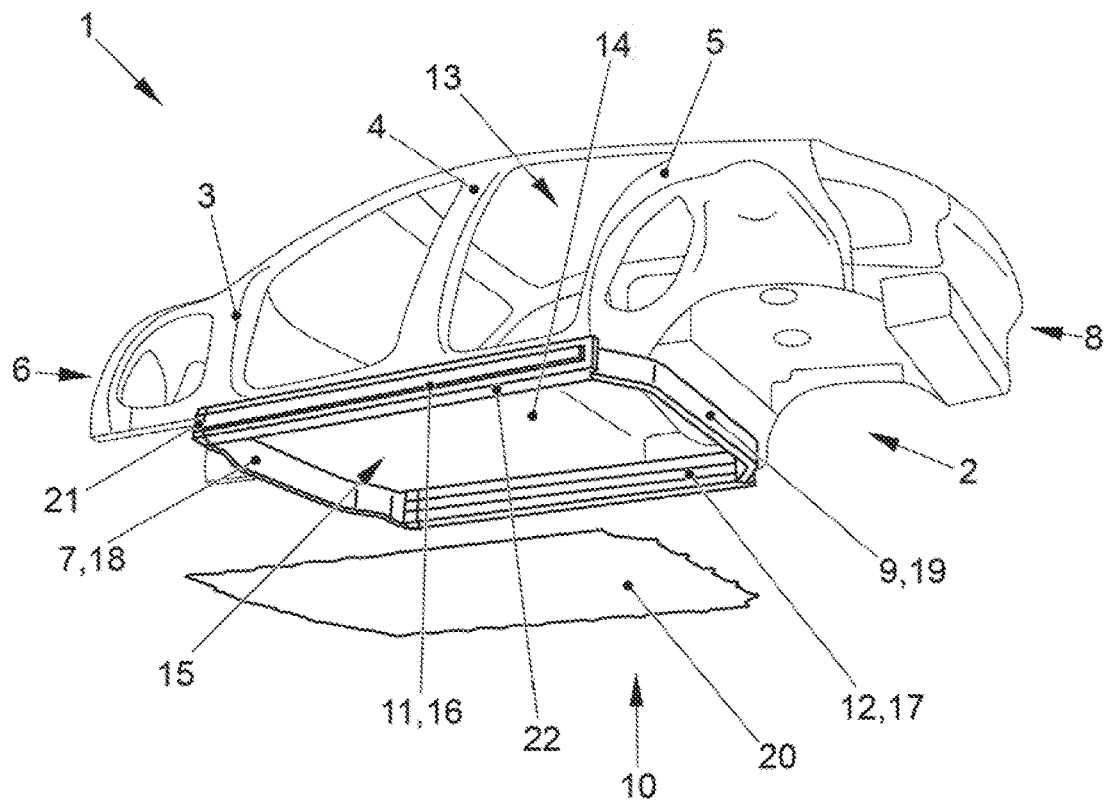
FIG. 2 shows the body structure according to FIG. 1 in a perspective exploded illustration from the rear and bottom.

A motor vehicle 1 which is equipped with a drive module designed as a battery module has a body structure 2, which is illustrated by way of example in FIG. 1. Similarly, the motor vehicle 1 could also have a drive module in the form of an internal combustion engine, wherein the latter would then be what is referred to an underfloor engine, or in the form of a combination of the battery module with the internal combustion engine. The body structure 2 has an "A pillar", a "B pillar" and a "C pillar". It is designed as a self-supporting body structure 2 which is customary in motor vehicle manufacturing.

The body structure 2 comprises a first structure transverse member 7 arranged facing a front 6 of the motor vehicle 1 and a second structure transverse member 9 arranged facing a rear 8 of the motor vehicle 1. Depending on the design of the body structure 2, that is to say, in other words, which type of body is involved, for example a station wagon, a saloon, a coupe or a convertible, the structure transverse members 7, 9 can be arranged at different points on a lower side 10 of the body structure 2.

Furthermore, the body structure 2 has a first structure longitudinal member 11 and a second structure longitudinal member 12 which are not necessarily connected to the structure transverse members 7, 9. A floor panel 14 is formed to delimit a passenger cell 13 of the body structure 2 downward in relation to the environment.

The body structure 2 has a receiving compartment 15 of the drive module which is bounded or surrounded by a first longitudinal member 16, a second longitudinal member 17, a first transverse member 18 and a second transverse member 19. The receiving compartment 15 is delimited upward, i.e., in other words, in relation to the passenger cell 13, with the aid of the floor panel 14 and is sealed in relation to the passenger cell 13. A covering panel 20 is provided opposite the floor panel 14, wherein the members 16, 17, 18, 19 are arranged between the two panels 14, 20. A compartment for arranging the drive module is therefore provided in the vertical direction between the panels 14, 20 and in the horizontal direction between the members 16, 17, 18, 19.

According to aspects of the invention, the longitudinal members 16, 17 correspond to the structure longitudinal members 11, 12 and the transverse members 18, 19 to the structure transverse members 7, 9, or vice versa. The longitudinal members 16, 17 are formed from a first material, the transverse members 18, 19 from a second material and the covering panel 20 from a third material, which materials have an identical main material, aluminum in this exemplary embodiment. The materials are in each case alloys which, apart from the identical main material, can have different alloy constituents. In the present exemplary embodiment, an aluminum alloy is involved. The main materials can also be steel or magnesium or titanium.

According to aspects of the invention, the longitudinal members 16, 17 and the transverse members 18, 19 are, in other words, formed integrally with the structure longitudinal members 11, 12 and structure transverse members 7, 9. That is to say, in other words again, that the longitudinal members 16, 17 and the transverse members 18, 19 are contained in the structure longitudinal members 11, 12 and the structure transverse members 7, 9, respectively, and they are therefore an integral part of the corresponding structure members 7, 9, 11, 12. The longitudinal members 16, 17 and the transverse members 18, 19 can completely or partially correspond to the structure longitudinal members 11, 12 and the structure transverse members 7, 9, respectively.

Similarly, the longitudinal members 16, 17 and the transverse members 18, 19 could also be formed independently of the structure longitudinal members 11, 12 and the structure transverse members 7, 9, respectively, and could be connected thereto either in a form- and/or force-fitting manner and/or in an integrally bonded manner, wherein they could be formed in a manner accommodating the structure longitudinal members 11, 12 or the structure transverse members 7, 9 in themselves. In this embodiment, in order to obtain the electromagnetic compatibility, the member regions arranged lying opposite would have to be sealed, preferably by welding.

The longitudinal members 16, 17 and/or transverse members 18, 19 could be configured, for example, in a sheet-metal shell design and/or profile design. In the present example, they are designed in a profile design as aluminum extruded profiles.

The longitudinal members 16, 17 are connected to the transverse members 18, 19 indirectly with the aid of structural elements 21. Said structural elements 21 are designed in the form of an aluminum sheet. Similarly, they could be designed as an aluminum die casting or aluminum forged part or as an aluminum extruded profile. The components longitudinal members 16, 17, transverse members 18, 19 and the corresponding structural elements 21 positioned in between are connected to one another in an integrally bonded manner, by means of welding. Similarly, they could also be connected to one another in a form-and/or force-fitting manner and/or in an integrally bonded manner, for example joined mechanically in combination with adhesive bonding.

Depending on the design of the body structure 2 and therefore the shape of the longitudinal members 16, 17 and transverse members 18, 19, these can also be connected directly to one another without the interconnection of structural elements. The longitudinal members 16, 17 and transverse members 18, 19 can likewise be connected to one another in a form- and/or force-fitting manner and/or in an integrally bonded manner. In the present exemplary embodiment, they are connected to one another in an integrally bonded manner, with the aid of a weld seam.

In order to ensure the stringent requirements regarding electromagnetic compatibility of the drive module, the covering panel 20 is connected to the longitudinal members, the transverse members and the structural elements 21 with the aid of connecting elements (not illustrated specifically), preferably in the form of releasable screws. A relatively small element distance is also formed between the individual connecting elements which are arranged virtually over a circumference of the covering panel 20, with a certain distance being maintained from the outermost edge of the covering panel 20.

Particularly preferred sealing of the receiving compartment 15 is realized by the covering panel 20 lying flat against the members 16, 17, 18, 19, wherein, for this purpose, member surfaces 22 of the longitudinal members 16, 17 and transverse members 18, 19 that are formed facing the covering panel 20 lie in one plane. That is to say, in other words, that the member surfaces 22 of the longitudinal and transverse members 16, 17, 18, 19 form a plane without intervals, and therefore the covering panel 20 can simply be fastened thereto and the receiving compartment 15 sealed in relation to the environment.

All of the abutting edges which are formed between the covering panel 20, the members 16, 17, 18, 19, the structural elements 21 and the floor panel 14 have a sealing element (not illustrated specifically). Said sealing element can be formed with the aid of an adhesive seam and/or a sealing cord and/or with the aid of PVC.

In a further exemplary embodiment (not illustrated specifically), the longitudinal members 16, 17 at least partially correspond to side sills of the body structure 2. That is to say, in other words, they are components of the side sills which are preferably composed of further body components.

The longitudinal members 16, 17 and the transverse members 18, 19, which can be designed in an arcuate or rectilinear manner, are connected directly to the floor panel 14 which, in the present exemplary embodiment, is in the form of a sheet-metal component. The receiving compartment 15 is delimited, in other words at least partially closed, in relation to the passenger cell 13 with the aid of the floor panel 14, wherein the receiving compartment 15 is preferably sealed by a sealing element (not illustrated specifically) attached to the floor panel 14 and at the same time is protected in accordance with electromagnetic compatibility requirements.

What is claimed is:

1. A body structure for a motor vehicle comprising:
   at least one A pillar,
   a first structure longitudinal member,
   a second structure longitudinal member,
   a first structure transverse member,
   a second structure transverse member,
   a floor panel for delimiting a passenger cell of the body structure in relation to an environment, and
   a receiving compartment of a drive module bounded by (i) a first longitudinal member formed from a first material, (ii) a second longitudinal member formed from the first material, (iii) a first transverse member formed from a second material, (iv) a second transverse member formed from the second material, (v) the floor panel, and (vi) a covering panel produced from a third material and configured for bounding the receiving compartment in relation to the environment,
   wherein the first structure longitudinal member and the second structure longitudinal member are mounted with the first longitudinal member and to the second longitudinal member, respectively, wherein the first structure transverse member and the second structure transverse member are mounted with the first transverse member and to the second transverse member, respectively, wherein the receiving compartment, the first structure longitudinal member, the second structure longitudinal member, the first structure transverse member, and the second structure transverse member integrally form part of the body structure and are each non-removably connected to the body structure, wherein the longitudinal members constitute side sills of the body structure, and wherein the first longitudinal member, the second longitudinal member, the first transverse member, and the second transverse member are substantially coplanar.

2. The body structure as claimed in claim 1, wherein the first material, the second material and the third material have an identical main material.

3. The body structure as claimed in claim 1, wherein the first material, the second material and the third material are an alloy.

4. The body structure as claimed in claim 3, wherein the alloy is an aluminum alloy.

5. The body structure as claimed in claim 1, wherein a main material of the materials is aluminum, steel, magnesium or titanium.

6. The body structure as claimed in claim 1, wherein at least one of the longitudinal members and the transverse members are configured in a sheet-metal shell design.

7. The body structure as claimed in claim 1, wherein at least one of the longitudinal members and the transverse members are connected either indirectly or directly to one another.

8. The body structure as claimed in claim 1, wherein member surfaces of the longitudinal members and transverse members that are formed facing the covering panel lie in one flat plane.

9. The body structure as claimed in claim 1, wherein a sealing element is formed in a manner at least partially surrounding the covering panel.

10. The body structure as claimed in claim 1, wherein at least one of the longitudinal members and the transverse members are either indirectly or directly connected to the floor panel.

11. A battery-operated motor vehicle having the body structure as claimed in claim 1, and wherein a drive module is a battery module.

12. The body structure as claimed in claim 1, further comprising a drive module, and wherein the drive module is a battery module.

13. The body structure as claimed in claim 1, wherein the first, second and third materials are different from one another.

14. The body structure as claimed in claim 1, wherein each of the first, second and third materials are composed of either aluminum, steel, magnesium or titanium.

15. The body structure as claimed in claim 1, wherein the receiving compartment, the first structure longitudinal member, the second structure longitudinal member, the first structure transverse member, and the second structure transverse member are welded together.

16. The body structure as claimed in claim 1, wherein the covering panel is a flat panel.

17. The body structure as claimed in claim 1, wherein the first structure longitudinal member, the second structure longitudinal member, the first structure transverse member, and the second structure transverse member are positioned in a vertical direction between the floor panel and the covering panel.

* * * * *